M. MINTZ.
TOOL FOR MAKING SPHERICAL VALVE SEATS.
APPLICATION FILED SEPT. 18, 1911.
1,063,995.
Patented June 10, 1913.
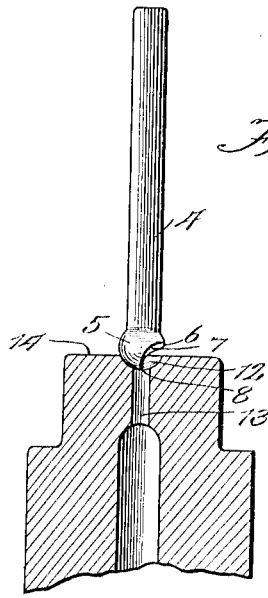
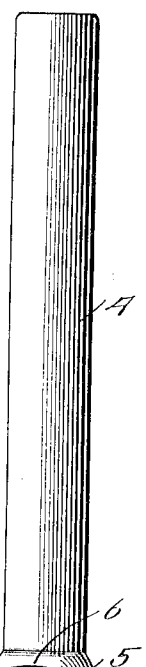
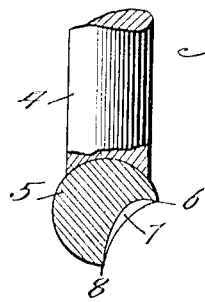

UNITED STATES PATENT OFFICE.

MIKE MINTZ, OF ROCK ISLAND, ILLINOIS, ASSIGNOR TO GEARLESS AUTOMATIC PUMP COMPANY, OF ROCK ISLAND, ILLINOIS, A CORPORATION OF ILLINOIS.

TOOL FOR MAKING SPHERICAL-VALVE SEATS.

1,063,995. Specification of Letters Patent. Patented June 10, 1913.

Application filed September 18, 1911. Serial No. 649,968.

*To all whom it may concern:*

Be it known that I, MIKE MINTZ, a citizen of the United States, residing at Rock Island, in the county of Rock Island and State of Illinois, have invented new and useful Improvements in Tools for Making Spherical-Valve Seats, of which the following is a full, clear, concise, and exact description, reference being had to the accompanying drawing, forming a part of this specification.

My invention relates to improvements in tools for making spherical valve seats and has for its object the production of a device by means of which a perfect fitting seat may be formed, adapted to fit any desired valve.

A further object is the production of a tool in which a duplicate of the unmounted valve may be utilized in forming a seat therefor.

A further object is the production of a tool of extremely simple construction, of great durability and cheapness, and one not at all liable to disarrangement of parts.

These and such other objects as may hereinafter appear are attained by my device, an embodiment of which is shown in the accompanying drawings, in which—

Figure 1 represents a sectional view of a finished valve seat, showing the tool in position therein; Fig. 2 represents an enlarged front elevation of my improved tool; and Fig. 3 represents a side elevation of my improved tool partly in section.

Like numerals of reference indicate like parts in the several figures of the drawing.

Referring now to the drawings,—4 represents a tool holder or shank having rigidly mounted in its lower end in any well known manner a steel ball 5, a portion of which has been cut away, as shown in the figures. This cut away portion or segment commences at or about a horizontal plane drawn through the center of the ball, as at 6, and curving downwardly, as shown at 7, to the bottom of the ball or lowermost portion of its vertical axis at 8. It will be understood that the cut away portion does not extend beyond the lowermost portion of the ball at 8. Another portion of the sphere is also cut away, as shown at 9 in Fig. 2, this cut removing a true segment of the sphere, the base of the segment being angularly disposed to the cut away face 7. The lower portion of the curved segment 9 is close to the bottom 8 of the sphere, forming a cutting point or edge 10 which is used when the tool is first rotated in forming the valve seat. The large cut away portion heretofore referred to may be a true segment of the sphere, but I find that by providing a curved base as shown at 7 I provide a sharp or acute angled cutting edge 11, by means of which quicker and more efficient seats may be formed than with the obtuse angled edge of the sphere in the case of the portion removed being a true segment.

In the manufacture of ball valves, it is of the utmost importance that the seats be accurate and formed exactly to the surface of the ball itself. My invention contemplates in the use of such a tool in the manufacture of valve seats that there will be absolutely no variation between the outer surface of the ball and the seat itself. This is accomplished by using as a basis of the tool a hard steel ball the exact duplicate of the ball of the valve itself. It is clearly apparent that by placing the stem or shank 4 in a proper tool and rotating the same rapidly, the cutting edge 11 of the lower portion of the sphere commences to cut out a spherical depression or seat 12, communicating with the passage 13 to be controlled by the valve. The operation can be continued until the seat is of the required depth. It is apparent that the diameter of the seat or passage above the same will never exceed the diameter of the ball 2. In the embodiment shown it will be noted that the stem or shank 4 is smaller than the ball of the tool. This is of course necessary when the seat falls below the outer surface 14. In the event, however, that the seat is shallow, as shown in Fig. 1, the stem or shank may be made of any size and the ball embedded deeper therein, care being taken to leave sufficient free cutting edge to form a seat of the required depth. In a construction of this character, a strong and more durable tool will be formed. It is also possible to have the shank and ball N formed integrally, but I find the simplest form of tool to be one in which a separate steel ball is used, rigidly secured to the stem or shank as shown in the drawing.

I claim:

1. A tool of the class described, comprising a shank, a spherical cutting member integral therewith, a segmental portion being cut away from said member forming a surface in said cutting member and providing cutting edges coincident with a portion of the surface of said member.

2. A tool of the class described, comprising a shank, a spherical cutting member rigidly mounted therein, a segmental portion having a convex base, being cut away from said member, forming a concave surface in said cutting member and providing cutting edges coincident to a portion of the surface of said member, a second portion being cut away from said member, the base of which intersects the concave section thereof.

3. A tool of the class described, comprising a shank, a spherical cutting member integral therewith, a segmental portion being cut away from said member forming a surface in said cutting member and providing cutting edges coincident with a portion of the surface of said member, a second segment being cut away from said member, the base of which intersects said surface.

In witness whereof, I have hereunto subscribed my name in the presence of two witnesses.

MIKE MINTZ.

Witnesses:
HARRY M. SCHRIVER,
BENJ. F. SCHRIVER.

Copies of this patent may be obtained for five cents each, by addressing the "Commissioner of Patents, Washington, D. C."